United States Patent [19]

Hase

[11] 4,082,831

[45] Apr. 4, 1978

[54] METHOD OF MAKING A MULTI-LEVEL FLOWER SUPPORTING NET ASSEMBLY

[75] Inventor: Chiaki Hase, Hazu, Japan

[73] Assignee: Daito Seimo Coshi Kaisha, Oaza-Ishiki, Japan

[21] Appl. No.: 799,335

[22] Filed: May 23, 1977

[51] Int. Cl.² .................. B29C 17/02; B29D 9/00; B29D 7/22
[52] U.S. Cl. ..................................... 264/249; 264/291; 264/294; 264/339; 264/342 R; 264/345; 264/DIG. 71; 264/DIG. 81
[58] Field of Search ............... 264/DIG. 70, DIG. 71, 264/DIG. 81, 285, 295, 342 R, 339, 294, 296, 280, 288, 345, 231, DIG. 66, 249, 234; 428/124, 130

[56] References Cited

U.S. PATENT DOCUMENTS 3,616,152  10/1971  Chandler .................. 264/342 R

FOREIGN PATENT DOCUMENTS 905,252  9/1962  United Kingdom ........ 264/DIG. 81

Primary Examiner—Willard E. Hoag
Attorney, Agent, or Firm—William F. Frank

[57] ABSTRACT

Disclosed is a method of making a multi-level assembly of flexible nets for supporting flowers to allow them to grow in straight, upstanding shape through the mesh openings of the nets which are raised progressively to different levels of height above a flower bed in accordance with the growth of the flowers. A plurality of nets are laid one upon another with their mesh openings substantially correctly aligned with one another and placed on a frame in a vertically zigzag folded pattern. Then, the nets are, together with the frame, immersed in a bath of a heating medium, such as hot water, to allow the nets to undergo thermal contraction, whereby the mesh openings of the nets are correctly with one another. The nets are, together with the frame, removed from the bath and allowed to cool. Then, the nets are removed from the frame with their folded shape substantially in order.

4 Claims, 7 Drawing Figures

METHOD OF MAKING A MULTI-LEVEL FLOWER SUPPORTING NET ASSEMBLY

This invention relates to a method of making a multi-level assembly of flexible flower supporting nets for maintaining flowers upright during their cultivation on a flower bed. The net assembly manufactured according to this invention is particularly advantageous in that the nets can individually be raised to a higher level in accordance with the growth of the plants in order to prevent them from falling and assist their growth in a straight, upstanding shape.

There are certain flowering plants, such as lilies, carnations and gladioluses, which may easily fall during their cultivation unless properly supported. These flowers are, therefore, usually supported by a plurality of nets made up of polyethylene, nylon or other flexible strings. These nets are sized to match the dimensions of a flower bed and have square mesh openings through which the plants pass. A plurality of (usually, three to nine) separate nets are laid one upon another on a flower bed with the meshes of one net vertically aligned with those of another. A flower is planted within each combined mesh opening of the nets and as the flowers grow, the uppermost net is first raised away from the other nets and held on a number of props upstanding from the edges of the flower bed at appropriate intervals. With further growth of the flowers, the other nets are raised one by one to a higher level with appropriate spacing therebetween to maintain all the plants upright.

It is, however, very difficult to ensure that when a plurality of nets are placed one upon another, the mesh openings of all the nets are aligned with one another to the extent sufficient to permit flowers to grow in a straight, upright shape through all the mesh openings. This presents a particularly serious problem with a large flower bed. There are apparently a number of factors involved. In the first place, it is practically difficult to obtain a plurality of nets having correctly aligned mesh openings. In the second place, the material of which the nets are made causes the nets to expand or contract to some extent or other. These two factors combine to create a considerable degree of misalignment between the mesh openings of the nets when they are laid on a flower bed. This misalignment makes it impossible to utilize a fairly large percentage of the mesh openings for planting flowers. Plenty of otherwise unnecessary time and labor are required to correct such misalignment. These inconveniences are largely due to the mode of handling during the installation of the nets at the site of their use. It has, thus, been very desirable to develop an improved method of making an assembly of such flower supporting nets which is always readily adaptable for any application intended even by unskilled persons with a minimum of time and labor.

In view of the problems hereinabove discussed, it is an object of this invention to provide a novel and improved method of making a multi-level assembly of flower supporting nets which can easily be spread over a flower bed altogether, rather than one by one as has been done in the prior art.

It is another object of this invention to provide a method of making a multi-level assembly of flower supporting nets in which the mesh openings of one net are aligned with those of another as correctly as is necessary to allow flowers to grow in a straight, upright shape.

It is a further object of this invention to provide a method of making a multi-level assembly of flower supporting nets which is of the compact, unitary construction to facilitate packing, storage and transportation and simplify the work of installation.

According to this invention, such a number of nets as will be required to form a flower supporting net assembly for use on a particular flower bed are laid one upon another. The nets may be made of string of thermally contractible synthetic resin, such as polyethylene and nylon, and their mesh openings are wide enough to include allowance for thermal contrction. Each net is as wide as the flower bed for which the final net assembly is to be used, and is elongate enough to cover the entire length of the flower bed. The nets thus laid one upon another are stretched over a frame having a multiplicity of upstanding supporting legs. All the nets have their mesh openings aligned with each other as the intersections of string formed by knotting or otherwise are at least partly held by the supporting legs on the frame. The nets are considerably greater in length than the frame and are folded in a vertically zigzag pattern on the frame. Then, the nets thus folded, together with the frame, are immersed in a bath of an appropriate heating medium at a predetermined temperature for a predetermined length of time, so that the nets are placed under tension due to the thermal contraction of the plastic material of which the nets are made. Thus, the mesh openings of all the nets are properly aligned with one another as they are reduced to the dimensions ultimately intended. The nets and the frame are removed from the bath and when the nets are allowed to cool down to an ambient temperature, they are removed from the frame while they are maintained in their zigzag folded shape.

The net assembly made according to this invention does not need to be handled one net by another when placed over a flower bed, but can vary easily be spread in a single operation. The net assembly does not present any misalignment of mesh openings which requires cumbersome correction between one net and another. Thus, all the mesh openings can effectively be used for planting flowers and as the flowers grow, the individual nets are raised one by one to a higher level to form a multilevel flower supporting net structure which assists the growth of the flowers in a straight, upstanding shape through the excellently vertically aligned mesh openings.

The foregoing and other objects, novel features and advantages of this invention will become apparent from the following detailed description and the accompanying drawings, in which.

The invention will now be described in further detail by way of example with reference to the drawings. According to this invention, the flower supporting net assembly comprises a plurality of nets 1 made of string of thermally contractible and weather-proof thermoplastic synthetic resin, such as polyethylene and nylon. The nets 1 may be made of singles of 5,000 to 10,000 denier and have 100 mm to 200 mm square mesh openings. The intersections 1M of string in the net 1 may be formed by knotting or by any other method of rigid fastening, or even by fusing if the string is strong enough to endure such treatment. The nets 1 are elongate and have a width substantially equal to the width of a flower bed on which the net assembly made of the nets 1 is intended for use. Each net 1 has three to ten mesh openings across its width, depending upon the width of the flower bed.

Figure 1:
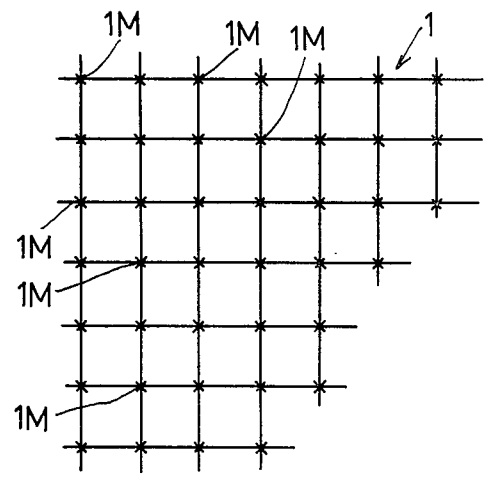
FIG. 1 is a fragmentary, diagrammatic top plan view of a net employed to practice this invention.
Figure 2:
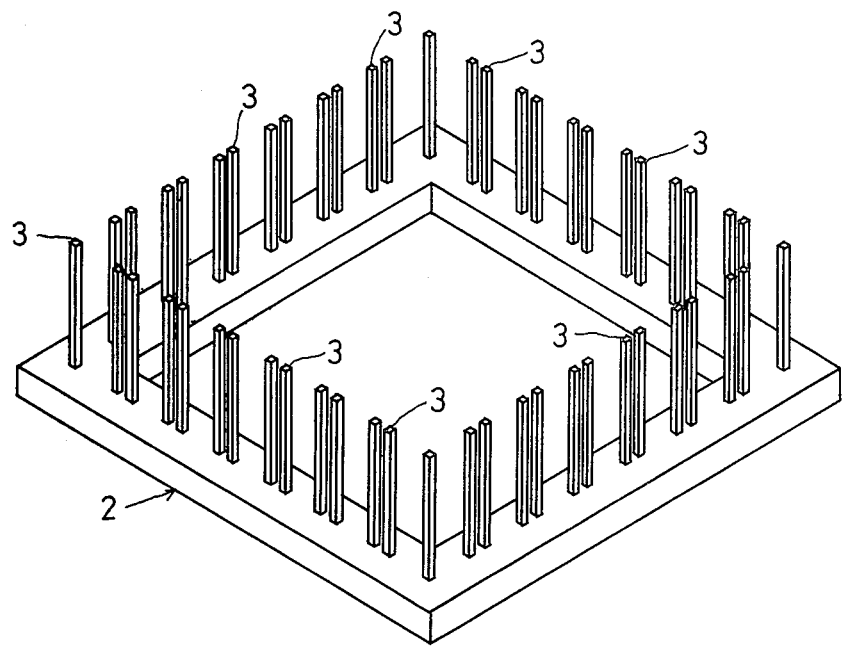
FIG. 2 is a perspective view of a frame used to perform the method of this invention.
Figure 3A:
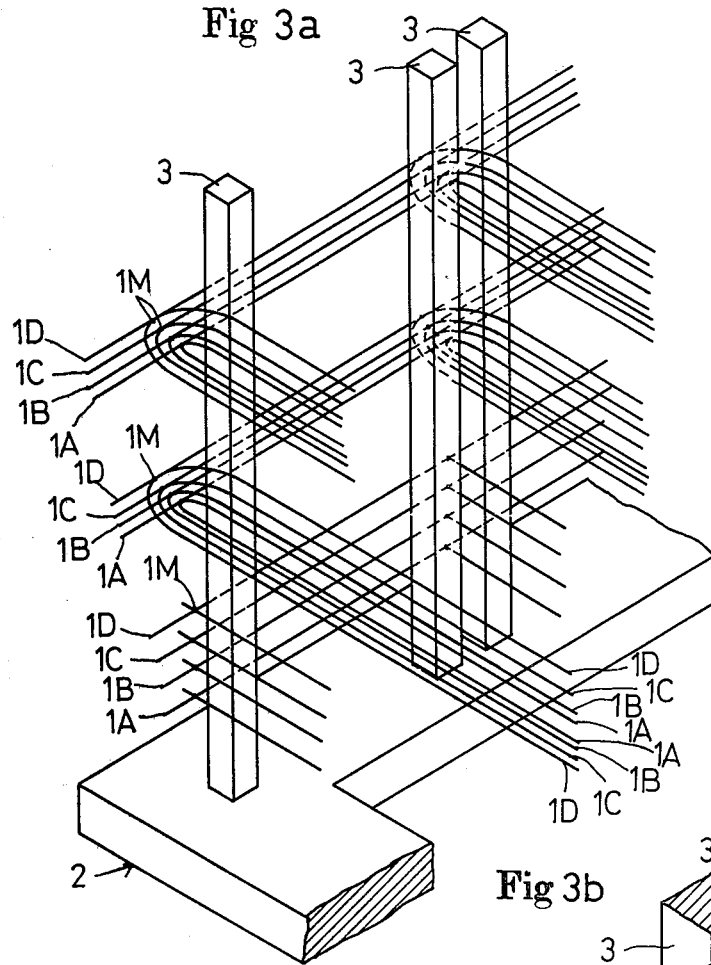
FIG. 3a is a fragmentary, enlarged view of FIG. 2 illustrating one step of the method.
Figure 3B:
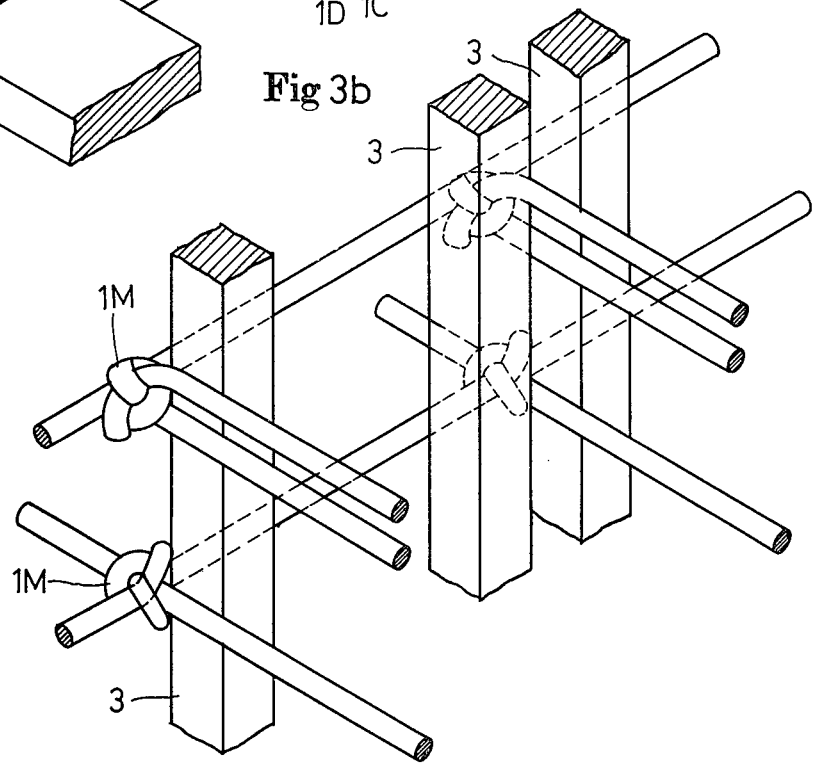
FIG. 3b is a fragmentary, enlarged view of FIG. 3a illustrating the mode of holding a net on the frame.

FIG. 2 shows a frame 2 which is used as a guide for aligning the mesh openings of the nets and as a support for the nets during the subsequent heat treatment thereof as will hereinafter be described in further detail. The frame 2 is square in shape and is provided with a plurality of upstanding supporting legs 3 juxtaposed in a line along each edge. The supporting legs 3 have a square cross-section and are arranged in pairs except for each corner of the frame 2 where only a single leg 3 is provided. Each pair of supporting legs 3 are spaced from each other to the extent necessary to provide a clearance through which the string can pass. This clearance is narrow enough to prevent passage of an intersection of string or knot 1M, but hold it between the two supporting legs 3 as illustrated in FIG. 3b. The spacing between one pair of supporting legs 3 and another is substantially equal to the width of the mesh openings in the final net assembly completed according to this invention. The number of the relatively large gaps defined between every two adjoining pairs of the supporting legs 3 along each edge of the frame 2 is equal to the number of the mesh openings which the final net assembly may have across its width. Alternatively, a pair of opposite edges of the frame 2 may be provided with a somewhat greater number of supporting legs 3 than the other two edges, so that the frame 2 will be made of the rectangular construction, of which the shorter sides correspond to the width of the net 1. The frame 2 and the supporting legs 3 thereon are usually made of metal, but may alternatively be made of heat-resistant synthetic resin. Further, the supporting legs 3 may be rectangular in cross-section and whether square or rectangular in cross-section, they may be chamfered along their longitudinal edges.

Figure 6:
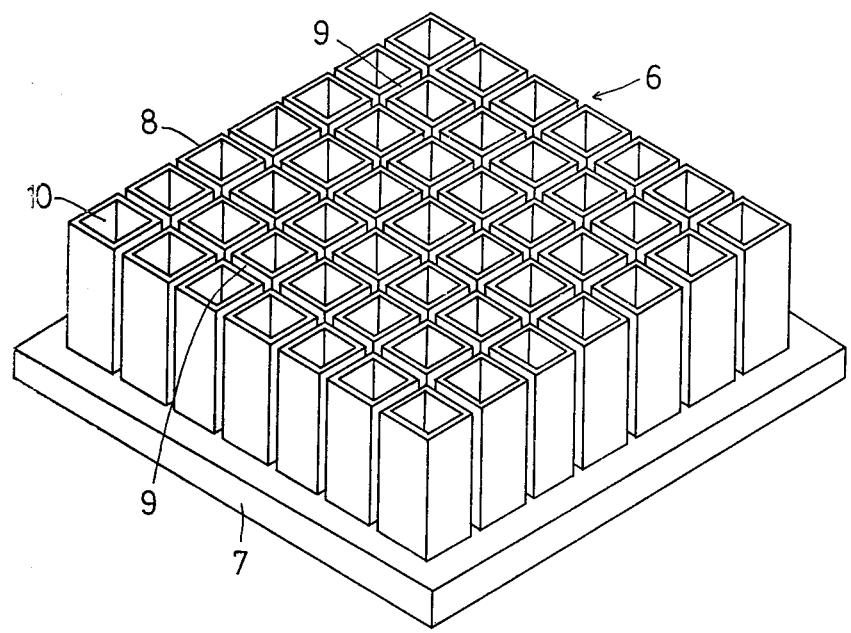
FIG. 6 is a perspective view of another form of the frame shown in FIG. 2.

A different form of the frame is generally indicated at 6 in FIG. 6. The frame 6 comprises a flat bottom plate 7 and a multiplicity of upstanding supporting legs 8 on the bottom plate 7. The supporting legs 8, each of which is a hollow structure of square cross-section, are arranged in a plurality of parallel lines which are parallel to each edge of the bottom plate 7. The supporting legs 8 are in close proximity to one another with a very narrow spacing 9 therebetween which is wide enough to receive string segments of a net when the net is placed over the frame 6. It will be observed that the frame 6 of FIG. 6 is of stronger construction than the frame 2 of FIG. 2 and can endure any tensile force exerted by the string during the latter's contraction when heated. The dense arrangement of the supporting legs 8 also ensures further improved alignment between the mesh openings of the final net assembly. The supporting legs 8 may be open at both ends and the bottom plate 7 is preferably formed therethrough with a multiplicity of holes each aligned with the axial bore 10 of one supporting leg 8.

The multi-level flower supporting net assembly according to this invention may preferably comprise from three to nine separate nets each having a width corresponding to the width of a particular flower bed to which the net assembly is applied. The following description of the invention by way of example refers to the manufacture of a net assembly comprising four nets 1A, 1B, 1C and 1D by using the frame 2 shown in FIG. 2. The nets 1A, 1B, 1C and 1D are elongate and at one end, they are laid one upon another with their mesh openings approximately aligned with one another. The nets 1A, 1B, 1C and 1D are then placed together on the frame 2 in such a manner that the one end of the nets may be positioned along one of the shorter edges of the frame 2 if the frame 2 is rectangular. The string segments of the nets are received in the narrow clearances between the supporting legs 3 as shown in FIGS. 3a and 3b. The knots 1M in the region surrounding the frame 2 are held against the supporting legs 3 at each corner of the frame 2 and between every pair of supporting legs 3 intermediately of the corners of the frame 2 as shown in FIG. 3b.

When a first layer of the nets 1A, 1B, 1C and 1D, which is a portion of the length of the nets, is spread across the frame 2 and positioned in the vicinity of the bottom of the supporting legs 3 as shown in FIG. 3a, the nets 1A, 1B, 1C and 1D are folded back and spread across the frame 2 again to form a second layer of net segments extending over the first layer. This operation is repeated to place a certain length of nets 1A, 1B, 1C and 1D on the frame 2 as illustrated in FIG. 3a. The nets 1A, 1B, 1C and 1D are, thus, folded in a zigzag pattern with the knots 1M along the periphery of the nets held by the supporting legs 3.

Figure 4:
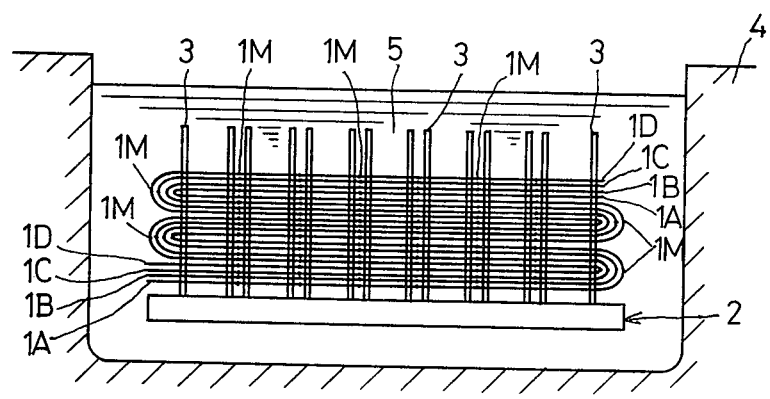
FIG. 4 is a side elevational view showing the heating step of the method of this invention.

The nets 1A, 1B, 1C and 1D are, then, placed in a heating pot 4, together with the frame 2, as shown in FIG. 4. The heating pot 4 contains a bath of hot water 5 maintained at a temperature ranging from about 80° C to 100° C. The nets are immersed in the bath 5 and kept there for a period from about one to three minutes for heat treatment. During this heat treatment, the nets 1A, 1B, 1C and 1D thermally contract and are stretched under tension across the frame 2. The knots 1M are tightened and the mesh openings of the nets are modified to uniform, correctly aligned dimensions by the supporting legs 3, whereby the nets 1A, 1B, 1C and 1D obtain mesh openings of ultimately desired dimensions.

The nets 1A, 1B, 1C and 1D held together in a zigzag pattern are, then, removed from the bath 5, together with the frame 2. Then, the nets are detached from the supporting legs 3 of the frame 2, while they are maintained in their folded pattern substantially as if they were still supported on the frame 2. In order to ensure that the nets are kept in order, it is preferable to fasten the nets temporarily at a number of points, for example, at the four corners thereof prior to their removal from the frame 2.

Figure 5:
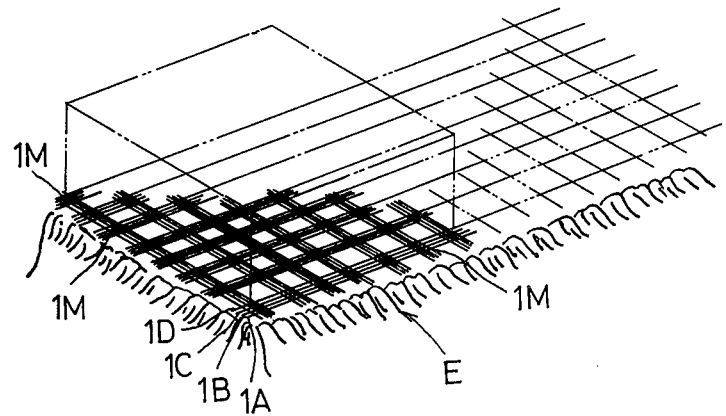
FIG. 5 is a perspective view illustrating a flower bed on which the flower supporting net assembly of this invention is installed.

Referring to FIG. 5, the net assembly thus formed is installed on a flower bed E. The nets 1A, 1B, 1C and 1D folded in a plurality of layers are placed on the flower bed E at one end of the latter and lifted at their upper ends. The nets are pulled along the length of the flower bed E and unfolded thereover, whereby the four nets 1A, 1B, 1C and 1D are spread over the flower bed E all together in a single operation with their mesh openings maintained in vertical alignment with one another.

Flowers are planted in the mesh openings of the nets and as the flowers grow, the individual nets are raised one by one to an increasingly higher level while an appropriate spacing is maintained between the nets. For instance, when the flowers have grown to a height of about 15 cm, the uppermost net 1D is raised to a level of 10 to 15 cm above the top of the flower bed E amd held in that position by a plurality of props upstanding from the edges of the flower bed E, though not shown in the drawing. When the flowers have become 10 to 15 cm taller, the uppermost net 1D is raised to a 10 to 15 cm higher level and held again on the props not shown. Then, the net 1C is raised away from the remaining nets 1B and 1A to a level of 10 to 15 cm above the flower bed E and held on the props. It will be appreciated that such progressive elevation of the nets will provide an adequate support for the flowers and assist their growth in straight, upright shape. With further growth of the flowers, the third net 1B is raised to a level of about 10 to 15 cm above the flower bed E after the first and second nets 1D and 1C have been elevated to a higher level. Ultimately, the lowermost net 1A is elevated to a level of about 10 to 15 cm above the flower bed E, so that the four nets are maintained in vertically spaced relationship to one another at intervals of about 10 to 15 cm.

While the invention has been described with reference to a preferred embodiment thereof, it is to be understood that modifications or variations may be easily made by those skilled in the art without departing from the spirit and scope of this invention as defined by the appended claims. For example, hot air or steam may be used, instead of hot water, to heat treat the nets. A substantially totally enclosed vessel may be used in which the temperature of hot air or steam and the duration of heat treatment may be appropriately controlled to suit the plastic material of which the nets are made. When the knots are relatively loose, the nets are heated at a relatively low temperature for a fairly long time, while they should be treated at a higher temperature for a short time if the knots are tight or if the intersections of the strings are formed by fusing.

What is claimed is:

1. A method of making a multi-level flower supporting net assembly, which comprises the steps, in combination, of:

laying one upon another a plurality of flexible nets made of string of thermally contractible synthetic resin and having a predetermined width, each of said nets being elongate and having mesh openings which are somewhat greater than the ultimately desired mesh dimensions to provide allowance for thermal contraction;

placing one end of said nets on a frame in such a manner that the mesh openings of one net are correctly aligned with those of another, and extending said nets along the length of said frame;

folding said nets in a vertically zigzag pattern and holding them on said frame;

immersing said nets, together with said frame, for a predetermined length of time in a heating medium maintained at a predetermined temperature to allow said nets to undergo thermal contraction and be placed under tension across said frame to obtain said ultimately desired mesh dimensions;

removing said nets, together with said frame, from said medium and allowing said nets to cool down to ambient temperature; and removing said nets from said frame, while maintaining said nets substantially in said zigzag pattern.

2. A method as defined in claim 1, wherein said nets are supported on a multiplicity of upstanding supporting legs extending from said frame; and the intersections of said string are held by and between said supporting legs.

3. A method as defined in claim 1, wherein said heating medium is a hot fluid.

4. A method as defined in claim 1, wherein said synthetic resin is selected from the group consisting of polyethylene and nylon.

* * * * *

UNITED STATES PATENT OFFICE
CERTIFICATE OF CORRECTION

Patent No. 4,082,831　　　　　　　　Dated May 23, 1977

Inventor(s) CHIAKI HASE

It is certified that error appears in the above-identified patent and that said Letters Patent are hereby corrected as shown below:

Assignee: DAITO SEIMO GOSHI KAISHA, Hazu, Aichi, Japan

Signed and Sealed this

Twenty-eighth Day of November 1978

[SEAL]

Attest:

RUTH C. MASON
Attesting Officer

DONALD W. BANNER
Commissioner of Patents and Trademarks